US011470818B2

(12) United States Patent
Stern et al.

(10) Patent No.: US 11,470,818 B2
(45) Date of Patent: Oct. 18, 2022

(54) CLAMPING ASSEMBLY FOR CHEWABLE DEVICE

(71) Applicants: Karl E. Stern, North Liberty, IA (US); Kristin D. Stern, North Liberty, IA (US)

(72) Inventors: Karl E. Stern, North Liberty, IA (US); Kristin D. Stern, North Liberty, IA (US)

( * ) Notice: Subject to any disclaimer, the term of this patent is extended or adjusted under 35 U.S.C. 154(b) by 119 days.

(21) Appl. No.: 17/095,971

(22) Filed: Nov. 12, 2020

(65) Prior Publication Data

US 2021/0212290 A1 Jul. 15, 2021

Related U.S. Application Data

(60) Provisional application No. 62/961,433, filed on Jan. 15, 2020.

(51) Int. Cl.
*A01K 15/02* (2006.01)
(52) U.S. Cl.
CPC .................. *A01K 15/026* (2013.01)

(58) Field of Classification Search
CPC .. A01K 15/026; A01K 15/025; A01K 5/0114; A01K 15/02
See application file for complete search history.

(56) References Cited

U.S. PATENT DOCUMENTS

| 7,278,374 | B2 * | 10/2007 | Mann | A01K 15/026 |
| | | | | 119/710 |
| 10,925,258 | B1 * | 2/2021 | Noaeill | A01K 15/026 |
| 2012/0012068 | A1 * | 1/2012 | Costello | A01K 15/025 |
| | | | | 221/282 |
| 2014/0360434 | A1 * | 12/2014 | Yacov | A01K 7/00 |
| | | | | 119/51.5 |
| 2017/0020109 | A1 * | 1/2017 | Dewey | F16B 7/20 |
| 2019/0261601 | A1 * | 8/2019 | Stone | A01K 5/02 |
| 2020/0113152 | A1 * | 4/2020 | Mcfarlane | A01K 15/026 |
| 2020/0154676 | A1 * | 5/2020 | Walt | B65D 83/0016 |

* cited by examiner

*Primary Examiner* — Trinh T Nguyen
(74) *Attorney, Agent, or Firm* — Zarley Law Firm PLC (57) ABSTRACT

A clamping assembly having a first clamping member and a second clamping member. The first clamping member has a first end and a second end with an opening positioned between the first and the second end that is adapted to receive a chewable member. The first clamping member and second clamping member are threadably connected to retain the chewable member.

12 Claims, 8 Drawing Sheets

CLAMPING ASSEMBLY FOR CHEWABLE DEVICE

CROSS REFERENCE TO RELATED APPLICATION

This application claims the benefit of U.S. Provisional Application No. 62/961,433, filed Jan. 15, 2020, the contents of this application is hereby incorporated by reference in its entirety.

BACKGROUND OF THE INVENTION

The present invention is directed to a clamping assembly and more particularly a clamping assembly for an animal chewable.

Animal chewables are well-known in the art such as rawhide and the like. While useful, some animals may swallow the chewable whole before chewing which can cause digestive problems sometimes requiring surgery and causing injury. To solve this problem clamping devices have been used to hold the chewable, but present devices are susceptible to the release of the chewable in a large form, thus not solving the problem.

Accordingly, an assembly is needed that addresses these deficiencies.

An objective of the present invention is to provide a clamping assembly that prevents the release of a chewable member in large phone.

Another objective of the present invention is to provide a clamping assembly that protects against digestive problems for dogs.

These and other objectives will be apparent to one of ordinary skill in the art based upon the following written description, drawings and claims.

SUMMARY OF THE INVENTION

A clamping assembly has a first clamping member and a second clamping member. The first clamping member has a first end, a second end, and an opening between the first and the second end adapted to receive a chewable member. The first clamping member also has a threaded bore that extends from the opening to the second end.

Preferably the opening has four walls with rounded corners where one of the four walls adjacent the first end of the first clamping member is angled with an apex pointed toward the first end. A stud, with a pointed end extends away from the apex toward the second end of the first clamping member. A separation wall having an opening is positioned between the bore and the opening to form one of the walls of the opening. The separation wall has a diameter smaller than the diameter of the bore.

The second clamping member has a first end, a second end, a first threaded section and an end section having a stud that terminates in a pointed end. The first clamping member and second clamping member are threadably connected. The first threaded section of the second clamping member terminates into a middle section having a diameter smaller than the first threaded section to form a shoulder. The middle section terminates into the end section which has a diameter smaller than the middle section to form a second shoulder. Preferably the stud of the second clamping member is conical in shape. Also, the clamping assembly preferably has a bone shape.

DETAILED DESCRIPTION OF THE PREFERRED EMBODIMENTS

Figure 1:
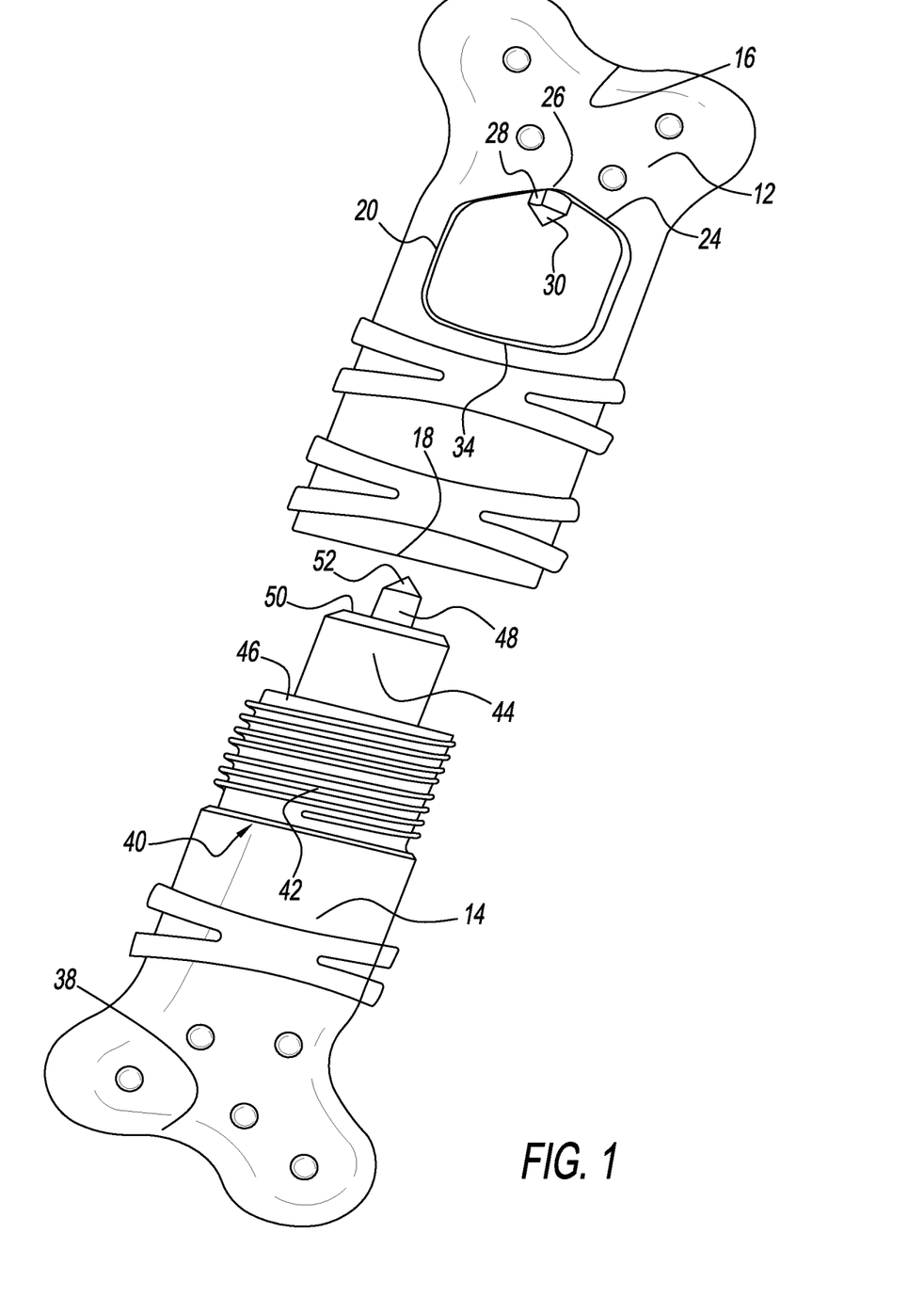
FIG. 1 is a perspective view of a clamping assembly.
Figure 2:
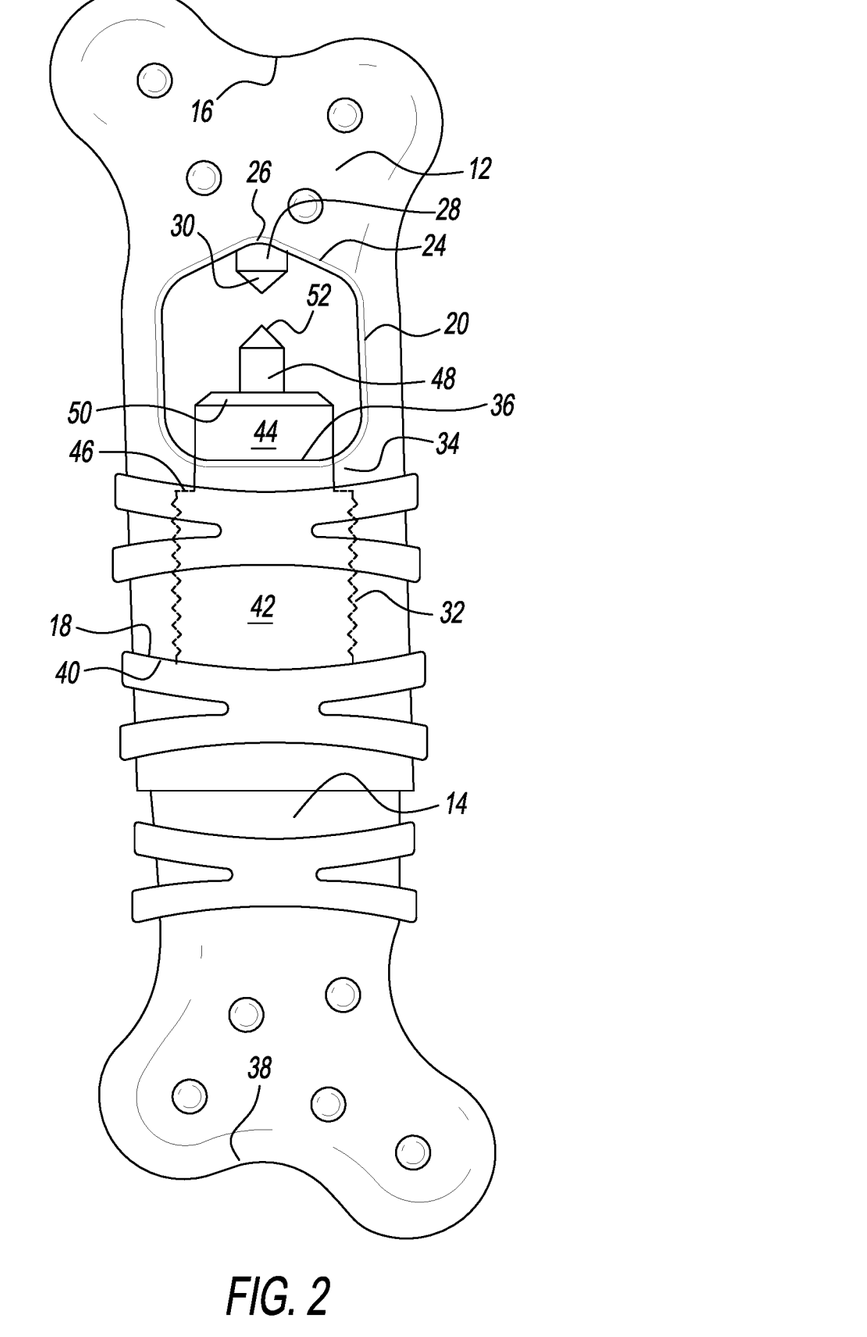
FIG. 2 is a top plan view of a clamping assembly.
Figure 3:
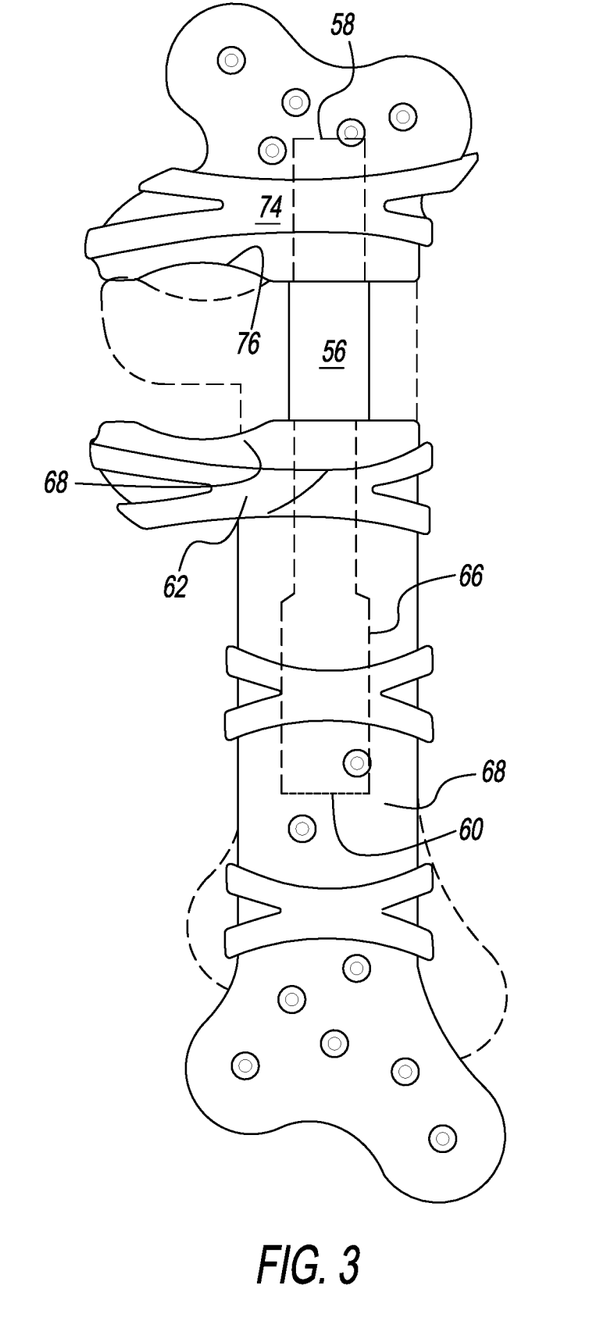
FIG. 3 is a side view of a clamping assembly.
Figure 4:
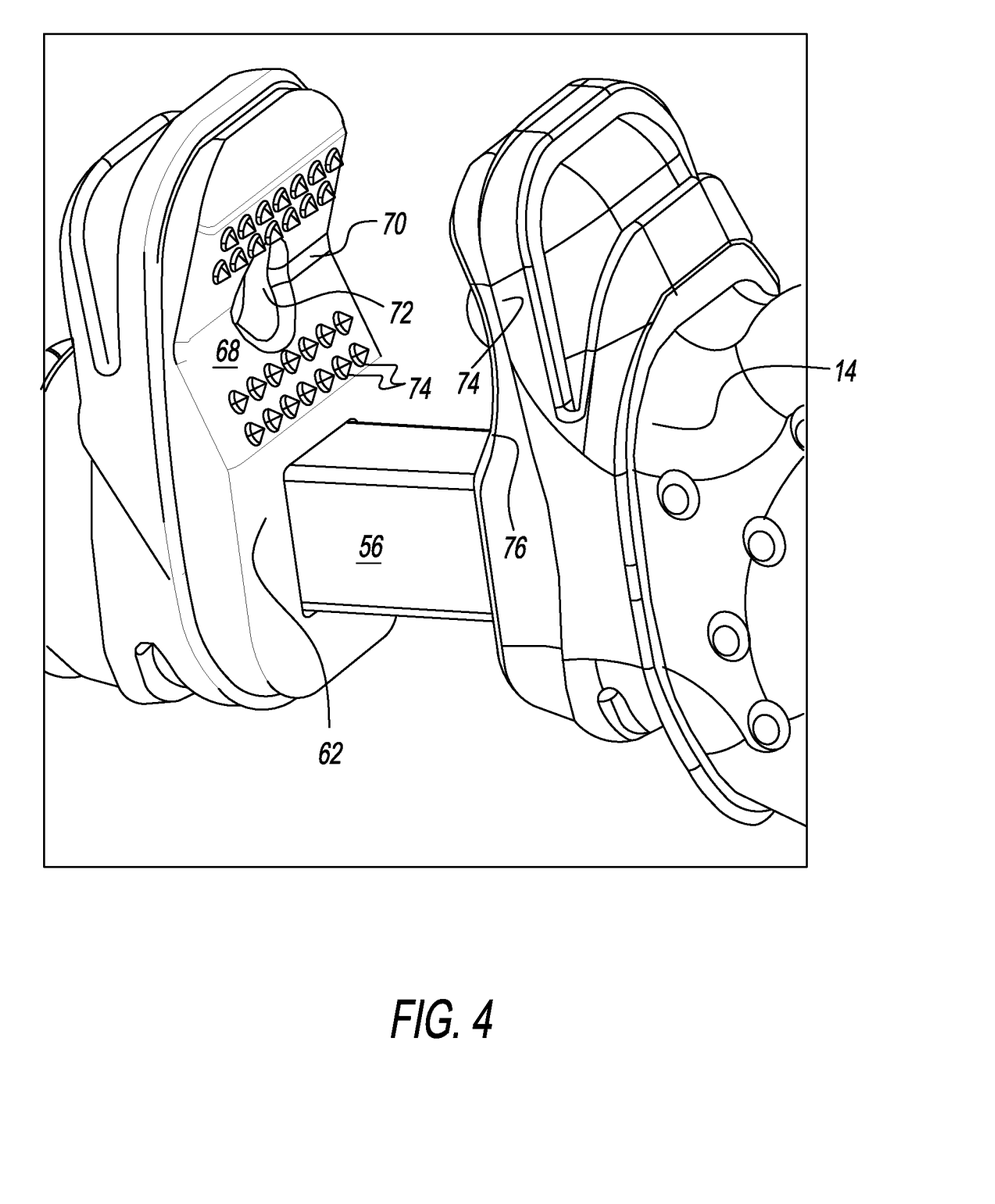
FIG. 4 is a partial perspective view of a clamping assembly.
Figure 5:
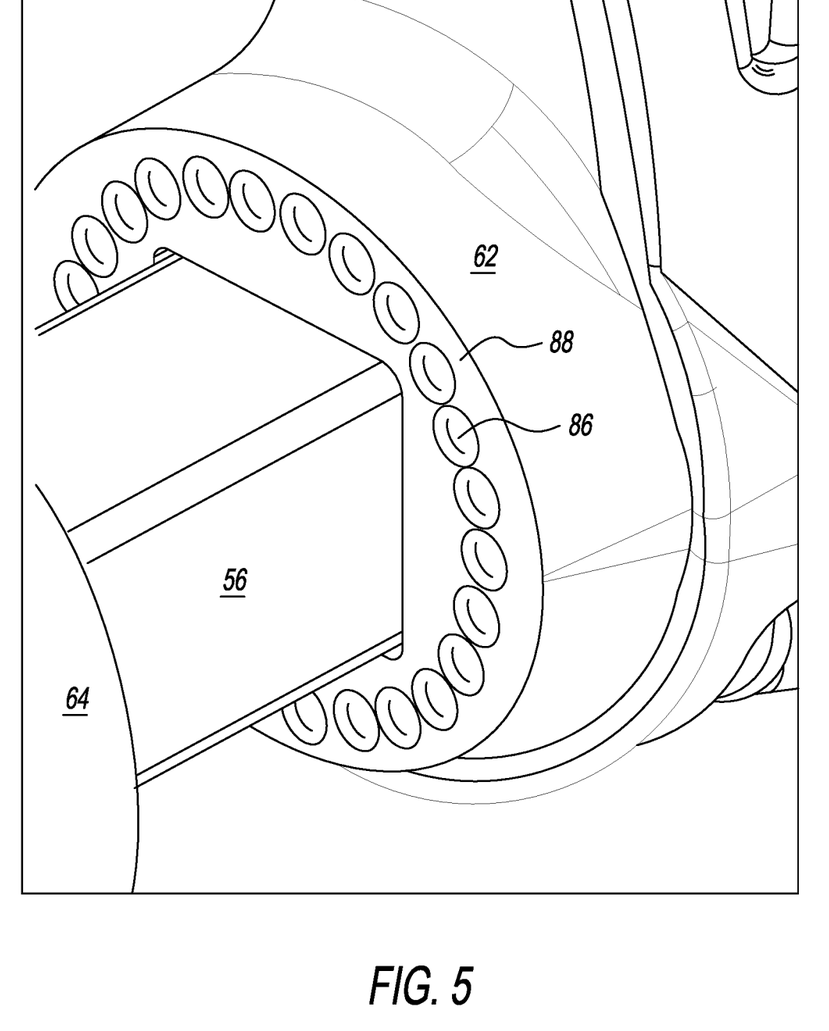
FIG. 5 is a partial perspective view of a clamping assembly.
Figure 6:
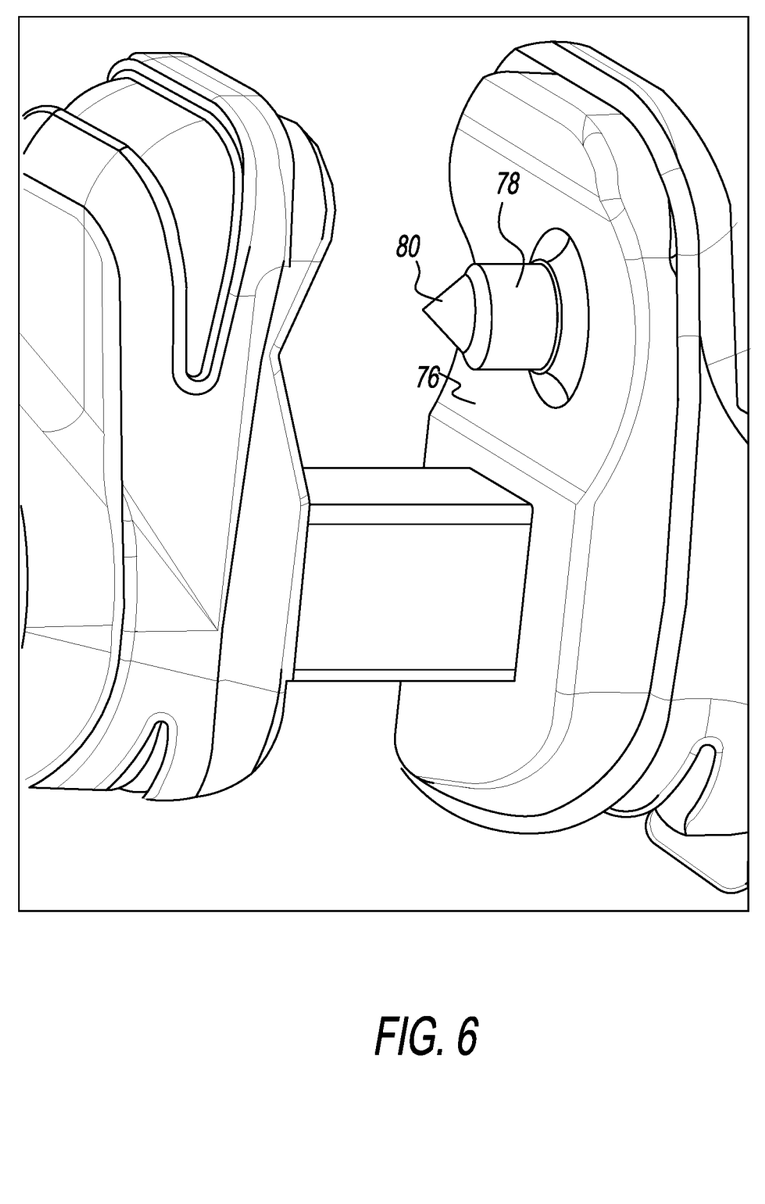
FIG. 6 is a partial perspective view of a clamping assembly.
Figure 7:
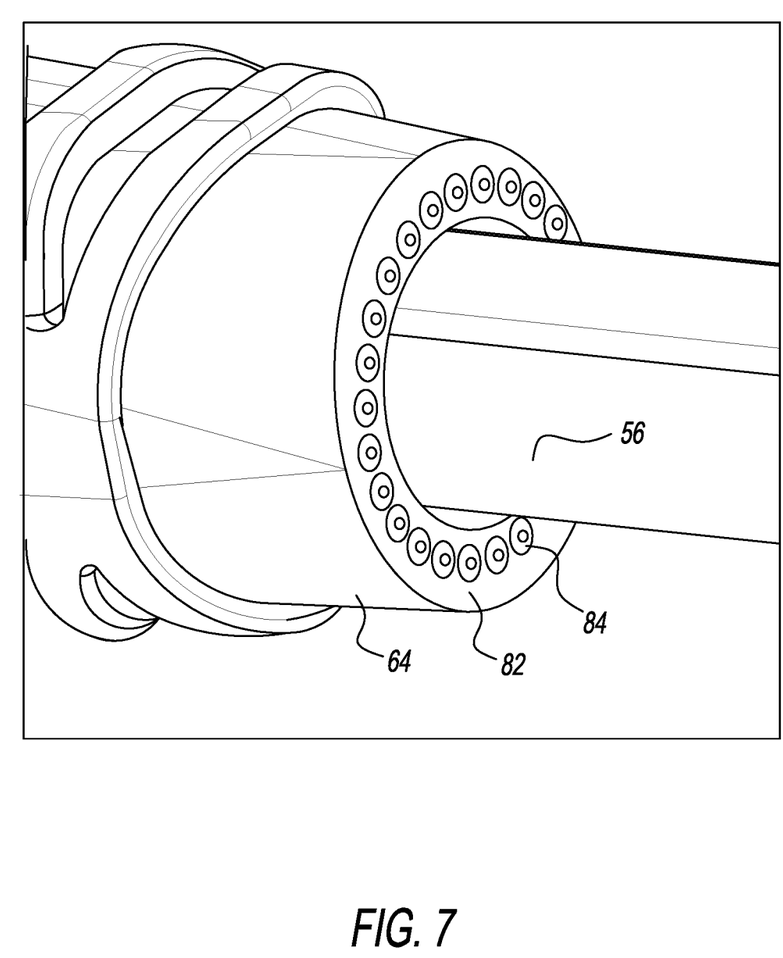
FIG. 7 is a partial perspective view of a clamping assembly.
Figure 8:
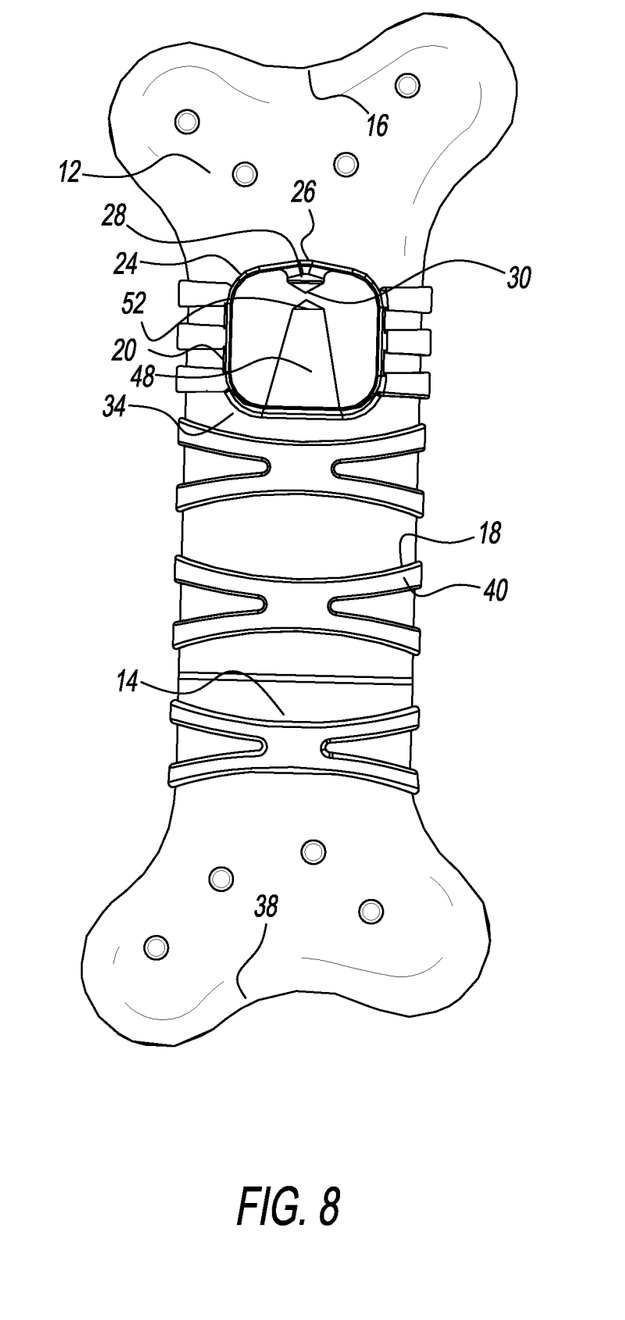
FIG. 8. Is a top plan view of a clamping assembly.

Referring to the Figures, a clamping assembly 10 has a first clamping member 12 and a second clamping member 14. The first clamping member 12 has a first end 16 and a second end 18. Between the first end 16 and the second end 18 is an opening 20 adapted to receive a chewable member 22. The chewable member 22 is of any type such as an elongated piece of rawhide, a bully stick, or the like.

The opening 20 is of any size, shape and structure. In the example shown, the opening 20 is generally square with four walls and rounded corners and one of the walls 24 adjacent the first end 16 that is angled and has an apex 26 pointed toward the first end 16. Extending away from the apex 26 toward the second end 18 is a stud 28 having a point 30 at an end.

Extending through the first clamping member 12 from the second end 18 to the opening 20 is a threaded bore 32. A separation wall 34 having an opening 36 with a diameter smaller than a diameter of the bore 32 is positioned between the bore 32 and the opening 20 and forms one of the walls of the opening 20 opposite the angled wall 24.

The second clamping member 14 has a first end 38 and a second end 40. The second end 40 has a first threaded section 42 that terminates in a second section 44 having a diameter smaller than the first 42 to form a first shoulder 46. The second section 44 terminates into a third section or stud 48 having a diameter smaller than the second section 44 to form a second shoulder 50. The stud 48 terminates in a pointed end 52. Preferably, the assembly 10 has the shape of a bone.

In operation, a hole 54 is punched or drilled into the chewable member 22. The chewable member 22 is then inserted into the opening 20 and the first stud 28 is inserted through the hole 54 of the chewable member 22.

The second clamping member 12 is then connected to the first clamping member 14 by inserting and rotating the second end 40 of the second clamping member 14 into the threaded bore 32 of the first clamping member 14. The threaded first section 42 is threadably mated to the threaded bore 32 and as the second clamping member 14 is rotated the second clamping member 14 extends further into the bore 32 of the first clamping member 12.

When fully inserted, the first shoulder 46 of the second clamping member 14 engages the separating wall 34 of the first clamping member 12 while the second section 44 extends through opening 36 of the separating wall, and the second stud 48 extends into the hole 54 of the chewable member 22 to secure the chewable member 22 within opening 20.

In another embodiment, the assembly 10 has an elongated support member 56 with a first end 58 and a threaded second end 60. The first clamping member 12 is mounted to the first end 58 of the support member 56. The second clamping member 14 is threadably and slidably connected to the support member 56. More particularly, the second clamping member 14 has a first clamping jaw 62 slidably mounted to the support member 56, and a tightening section 64 having a threaded bore 66 that is threadably attached to the threaded second end 60.

The clamping jaw 62 extends transversely away from the support member 56 and has an angled wall 68 having an apex 70 pointing away from the first clamping member 12. Preferably, the angled wall 68 has a cavity 72 at the apex 70 and a plurality of teeth 74 on the surface of the angled wall 68.

The first clamping member 12 has a jaw portion 74 that extends transversely outwardly from the support member 56 and aligns with the clamping jaw 62 of the second clamping member 14. The jaw portion 74 has a wall 76 that faces the angled wall 68 of the clamping jaw 62 that is preferably arcuate. Extending from the wall 76 toward the angled wall 68 is a stud 78 having a pointed end 80. The stud 78 is aligned with and positioned to be selectively received within the cavity 72 of the clamping jaw 62.

An end 82 of the tightening section 64 has a ring of detents 84 that are positioned to align with and be received within a ring of holes 86 on an engaging end 88 of the clamping jaw 62 to lock the tightening section 64 in position once tightened.

In operation, the stud 78 is inserted through hole 54 of the chewable member 22. The tightening section 64 is rotated about the threaded second end 60 of the support member which pushes clamping jaw 62 toward the first clamping member 12. As the clamping jaw 62 moves toward the first clamping member 12 the stud 78 extends into cavity 72 securing the chewable member 22 about stud 78.

From the above discussion and accompanying figures and claims it will be appreciated that the clamping assembly 10 offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A clamping assembly, comprising:
    a first clamping member and a second clamping member;
    the first clamping member having a first end, a second end, an opening between the first and the second end adapted to receive a chewable member, and a threaded bore that extends from the opening to the second end;
    a first stud extending into the opening of the first clamping member towards the second end of the first clamping member;
    the second clamping member having a first end, a second end, a first threaded section and a second section having a second stud that terminates in a pointed end; and
    wherein the first clamping member and second clamping member are threadably connected.

2. The assembly of claim 1 further comprising the opening formed by four walls having rounded corners.

3. The assembly of claim 2 wherein one of the four walls adjacent the first end of the first clamping member is angled with an apex pointed toward the first end.

4. The assembly of claim 3 wherein the first stud has a pointed end and the stud extends away from the apex toward the second end of the first clamping member.

5. The assembly of claim 1 wherein a separation wall having an opening with a diameter smaller than the diameter of the bore is positioned between the bore and the opening and forms one of the walls of the opening.

6. The assembly of claim 1 wherein the first threaded section of the second clamping member terminates into a third section having a diameter smaller than the first threaded section to form a first shoulder.

7. The assembly of claim 6 wherein the third section terminates into the second section which has a diameter smaller than the third section to form a second shoulder.

8. The assembly of claim 1 wherein the second stud of the second clamping member is conical in shape.

9. The assembly of claim 1 wherein the assembly has a bone shape.

10. A clamping assembly, comprising:
    a first clamping member and a second clamping member;
    the first clamping member having a first end, a second end, an opening between the first and the second end adapted to receive a chewable member, and a threaded bore that extends from the opening to the second end;
    the second clamping member having a first end, a second end, a first threaded section and a second section having a stud that terminates in a pointed end; and
    wherein the first clamping member and second clamping member are threadably connected;
    wherein the first threaded section of the second clamping member terminates into a third section having a diameter smaller than the first threaded section to form a first shoulder.

11. The assembly of claim 10 wherein the third section terminates into the second section which has a diameter smaller than the third section to form a second shoulder.

12. A clamping assembly, comprising:
    a first clamping member and a second clamping member;
    the first clamping member having a first end, a second end, an opening between the first and the second end adapted to receive a chewable member, and a threaded bore that extends from the opening to the second end;
    the opening in the first clamping member having four walls, wherein one of the walls adjacent the first end of the first clamping member is angled with an apex pointed towards the first end;
    a first stud extends away from the apex toward the second end of the first clamping member;
    the second clamping member having a first end, a second end, a first threaded section and a second section having a second stud that terminates in a pointed end; and
    wherein the first clamping member and second clamping member are threadably connected.

* * * * *